United States Patent [19]
Laberge et al.

[11] Patent Number: 6,012,148
[45] Date of Patent: Jan. 4, 2000

[54] PROGRAMMABLE ERROR DETECT/MASK UTILIZING BUS HISTORY STACK

[75] Inventors: Paul A. Laberge, Shoreview; Gregory B. Wiedenman, Woodbury, both of Minn.

[73] Assignee: Unisys Corporation, Blue Bell, Pa.

[21] Appl. No.: 08/790,629

[22] Filed: Jan. 29, 1997

[51] Int. Cl.[7] .................................................. G06F 11/00
[52] U.S. Cl. ......................................................... 714/2
[58] Field of Search ............................. 395/181, 182.03, 395/182.13, 182.14, 185.01, 185.02, 185.03, 185.06; 371/21.6, 22.2, 37.7, 40.2

[56] References Cited

U.S. PATENT DOCUMENTS

| | | | |
|---|---|---|---|
| 4,912,707 | 3/1990 | Kogge et al. | 371/12 |
| 5,423,026 | 6/1995 | Cook et al. | 395/182.21 |
| 5,495,573 | 2/1996 | Datwyler et al. | 395/185.01 |
| 5,822,512 | 10/1998 | Goodrum et al. | 395/182.11 |

Primary Examiner—Robert W. Beausoliel, Jr.
Assistant Examiner—Pierre E. Elisca
Attorney, Agent, or Firm—Charles A. Johson; Mark T. Starr; Altera Law Group

[57] ABSTRACT

An error detection and recovery apparatus for monitoring, and recovering from, errors in a system having one or more logic units. An error detector detects errors in the logic units, and provides error signals in response. A first error processor receives selected error signals, and performs system recovery according to the particular error signals present. A second error processor receives other selected error signals, and performs error recovery of the logic unit only, without affecting the rest of the system. The second error processor performs error recovery through real-time execution of error recovery routines at the logic unit. A selector is provided to determine which of the error signals are provided to the first and second error processors. A memory stack having multiple memory locations is also provided to store bus information captured from a bus, which can be used by the second error processor in its error recovery.

33 Claims, 5 Drawing Sheets

PROGRAMMABLE ERROR DETECT/MASK UTILIZING BUS HISTORY STACK

FIELD OF THE INVENTION

This invention relates generally to error detection and recovery, and more particularly to an apparatus for providing a bifurcated system/unit error recovery wherein error recovery can selectively be performed on a system or unit basis.

BACKGROUND OF THE INVENTION

As today's computer systems are continually enhanced with respect to speed and computing power, the intricate nature and complexity often increases in parallel. To maintain a high degree of reliability in such systems, error processing is used to locate, report, and act on system faults and faults within particular components within the system. Error processing is important during the real-time execution of the computer system, but is also important during system test.

Various testing mechanisms have been used to help locate system or component errors, and often to assist in error recovery. Many testing mechanisms are most beneficial where a system or unit is not operating in real time. For example, test fixtures using bed-of-nails and in-circuit testing provides adequate testing on a component or trace level. Furthermore, scan testing is often used for custom VLSI chips and ASICs, because the internal signals simply are not accessible. Scan methods considers any digital circuit to be a collection of registers or flip-flops interconnected by combinatorial logic where test patterns are shifted into a large shift register organized from the storage elements of the circuit.

It is often the case that testing is most beneficial during real-time execution of the system, where actual signals can be used rather than simulated signals. Furthermore, error detection and recovery during normal computer operation is necessary to maintain a high level of system reliability. For example, error processing in a mainframe computer system may be configured to generate interrupts to a special error processing device, either during diagnostic testing or during normal computer operation. This special processing device is referred to as a support controller, which is designed to take recovery actions based on the particular unit within the system that failed or generated a fault condition. The support controller may itself monitor a particular unit, or may act on a reported error originating from a particular unit or "watchdog" hardware/software component which monitors for specific faults and reports them to the support controller.

It is not always desirable, however, to allow the support controller to perform unit recovery, since this recovery can be intrusive, interrupting a unit's normal operations. For example, sometimes the support controller must stop a unit's clock to perform a scan operation, which clears an existing error condition. Moreover, support controller-initiated recovery is often unacceptably slow. Finally, certain unit errors cause the support controller to remove the affected unit from the running partition, which requires operator intervention before the unit is again operational.

The problems discussed above become particularly evident during hardware test, and even more particularly where bus designs are involved. Design errors can cause problems which can not be addressed using support-controller-based recovery. Assume, for example, a hardware problem is discovered during testing of an input/output (I/O) unit. The error may result in the latching of a "Bus Error" condition being incorrectly set every time a certain sequence occurs on the I/O bus. Although the support controller can reinitialize arid restart the unit, testing cannot continue, as the test procedure that generated the error continuously stops and restarts the testing procedure.

A less intrusive recovery mechanism is therefore needed so that testing can continue despite known hardware problems. Ideally, such a mechanism would allow bypassing particular unit errors at the unit level, so that the support controller does not require notification every time that a persistent hardware fault occurs. The present invention provides a flexible, bifurcated error processing scheme which allows particular unit errors to be managed separately so that these particular errors can be masked to allow testing to be completed.

The flexibility of using a bifurcated error processing scheme as in the present invention further paves the way for providing other testing schemes which allow testing to be completed without interruption. The present invention further provides a bus analyzing scheme which takes advantage of the bifurcated error processing scheme of the present invention.

During hardware testing, logic state analyzers are often used to discover logic problems. A logic analyzer in its simplest form is a multichannel oscilloscope used to detect logic states. Logic analyzers also include memory for shifting in data and storing a predetermined number of bits for each analyzer channel. Such logic analyzers can be particularly helpful in analyzing bus signals. In some prior art systems, custom-built analyzers have been used to test the I/O bus and I/O units.

While custom-built analyzers provide bus visibility, they have several disadvantages. First, they may occupy a card slot in the computer system such that the computer cabinet involved in the test can not be fully populated. Also, the analyzers are not monitored from the operator's console, therefore requiring a person to gather test results by going back and forth between the console and the analyzer located in the I/O cabinet. This inconvenience may increase the time needed to complete testing.

Furthermore, if a failure occurs during normal system operation and bus analysis is required, the cabinet housing the failed component must be powered down so that an analyzer can be inserted in an empty card slot of the system. This is because an analyzer is not normally resident in the machine. After the cabinet is reloaded and reinitialized, the error must be recreated, which is often very difficult to accomplish.

Finally, information stored in a custom incabinet analyzer is not available for unit recovery. For example, a particular unit can not read the data stored in the logic analyzer to determine the fault type, which would be required to take the appropriate recovery action.

The present invention overcomes these problems by providing a bus history stack which is used in conjunction with a programmable bus analyzer. The testing flexibility of the bifurcated error processing scheme, in conjunction with the programmable bus analyzer and bus history stack, provides for a more user-friendly yet powerful testing and error analysis/recovery environment. The present invention therefore provides a solution to the aforementioned and other problems, and offers other advantages over the prior art.

SUMMARY OF THE INVENTION

The present invention relates to an apparatus for providing a bifurcated system/unit error recovery wherein error recovery can selectively be performed on a system or unit basis, and wherein unit error recovery utilizes a bus history stack to assist in unit recovery which can thereby be performed without interruption to the system.

In accordance with one aspect of the invention, an error detection and recovery circuit for monitoring for system errors is provided. The system may include one or more individual logic units that together makes up the complete system. An error detection mechanism is provided to detect the errors in any of the logic units, and to provide error signals to indicate which of the logic units had an error and what error occurred. A first error recovery mechanism receives the error signals, and can perform a system-level recovery based on the particular error that occurred. A second error recovery mechanism also receives the error signals, and can perform a unit-level recovery. The unit-level recovery is accomplished through real-time execution of error recovery routines, which have been prepared to recover from the particular fault or error. The unit that exhibited the error includes the second error recovery mechanism in order to separately recover from the error, thereby bypassing the system-level recovery of the first error recovery mechanism.

An error recovery selector is provided to allow selection of either the first or second error recovery mechanism. This allows particular errors to be handled on a system basis, and other errors to be handled on a unit basis, depending on the scope of the error. Mask registers are used to mask error signals to the first error recovery mechanism, which allows the unmasked error signals to pass to the second error recovery mechanism. Similarly, other mask registers are used to mask error signals to the second error recovery mechanism, which allows the unmasked error signals to pass to the first error recovery mechanism.

In accordance with another aspect of the invention, a error detection and recovery circuit for recovering from hardware errors in a target circuit is provided. An error detector is coupled to the target circuit to detect errors in the target circuit. The error detector further provides an error signal for each of the errors discovered. An error recovery mechanism receives the error signals, and performs error recovery through real-time execution of error recovery routines. Different error recovery routines are provided to recover from different target circuit errors.

A bus history analyzer is coupled to the error recovery mechanism to collect target system information. The target system information is collected from a bus which transmits the information between various components within the target circuit. The bus history analyzer provides the system information to the error recovery mechanism to provide useful information for effecting the error recovery.

In accordance with yet another aspect of the invention, an error detection and recovery circuit for monitoring, and recovering from, errors in a system having one or more logic units is provided. An error detector detects errors in the one or more logic units, and provides error signals in response. A first error processor receives selected ones of the error signals, and performs system recovery according to the particular error signals present. A second error processor receives other selected ones of the error signals, and performs error recovery of the logic unit only, without affecting the rest of the system. The second error processor performs error recovery through real-time execution of erro:recovery routines at the logic unit. A selector is provided to determine which of the error signals are provided to the first and second error processors. A memory stack having multiple memory locations is also provided to store bus information captured from a bus. The second error processor utilizes the captured bus information in its error recovery.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
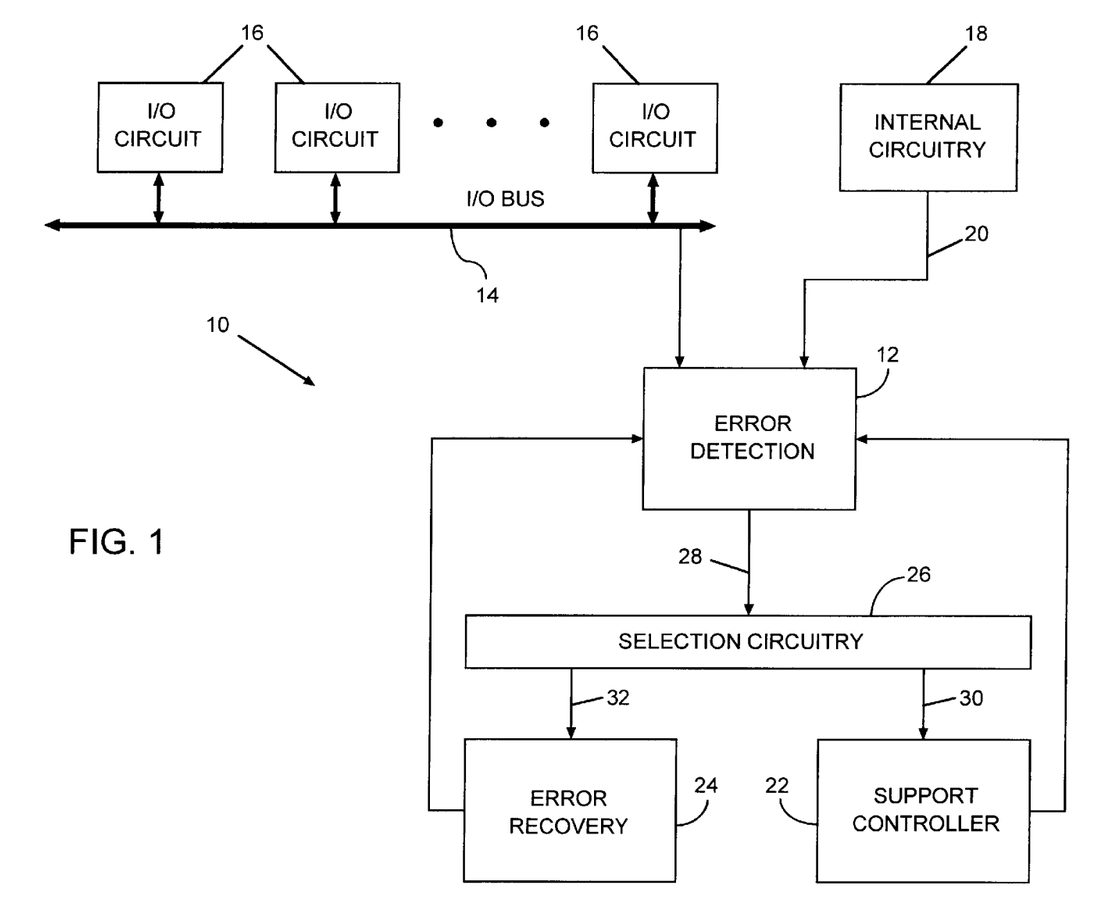
FIG. 1 is a block diagram of an error detection system in accordance with the present invention.

FIG. 1 is a block diagram of an error detection system 10 in accordance with the present invention. The error detection system 10 includes error detection logic 12 which can detect a variety of different types of errors, such as bus parity errors, data transfer delay errors, and data transfer errors resulting from data being sent to an incorrect address. The error detection logic 12 is shown coupled to the input/output (I/O) bus 4, which is a common path that connects various I/O devices or circuits 16. This connection allows the error detection logic 12 to detect errors from any I/O circuit 16 that is coupled to the I/O bus 14. The error detection logic 12 can also detect errors in circuitry or logic that is not coupled to the I/O bus 14, such as internal circuitry 18 monitored from a connection represented by line 20.

The present invention provides a bifurcated scheme for managing system errors and faults. The invention provides a support controller 22 and an error recovery circuit 24. Selection circuit 26 allows a desired error management path to be taken, depending on whether the system is under test, the type of fault, the type of recovery desired, as well as other factors. Errors detected by the error detection circuitry 12 are provided to the selection circuitry via a connection represented by line 28. The selection circuitry determines whether the error is to be directed to the support controller 22 or the error recovery circuitry 24. Lines 30 and 32 represent the communication of signals used to notify the support controller 22 or the error recovery circuit 24 that it has been selected to handle the particular error or fault that was detected by the error detection circuit 12. In one embodiment of the invention, the communications transmitted across lines 30 and 32 are interrupt signals which trigger the respective circuit by way of interrupt technology.

The support controller 22 represents a remote special error-processing computer system that monitors the system for errors, and reports error conditions ranging from non-critical status reports to critical faults requiring system shut-down. It can also take corrective action to recover from particular system errors or unit errors from a particular unit that failed or generated a fault condition within the system. However, it is a remote system, and can be unacceptably slow in handling particular errors and faults. Also, the recovery procedures are often very intrusive to the normal operation of the computer system. For example, in one embodiment, the support controller stops the system clock to perform a scan operation, which clears the existing error condition. This type of recovery may be unacceptable in some circumstances.

The support controller is suited for system level recovery. This includes multi-unit recovery, and recovery based on power supply or clocking problems which may affect various portions of the system as a whole. Errors occurring during initialization are also the type of errors that are suited for system-level recovery, as individual units may need to be properly initialized before any unit-level recovery would be possible. Furthermore, the support controller in one embodiment of the invention provides for error logging and error reporting.

The bifurcated scheme of FIG. 1 allows particular errors to be handled solely by the error recovery circuit 24 where support controller action is undesirable. For example, a computer engineer repeatedly experiencing the same error can mask the error at the selection circuitry 26 so that the error does not reach the support controller 22, and can further enable the error to reach the error recovery circuit 24. When the same problem again occurs, only the error recovery circuitry 24 will receive the corresponding interrupt. The error recovery circuitry 24 can then determine which error occurred, and take appropriate remedial action, eliminating the need to notify the support controller 22 of the error.

Figure 2:
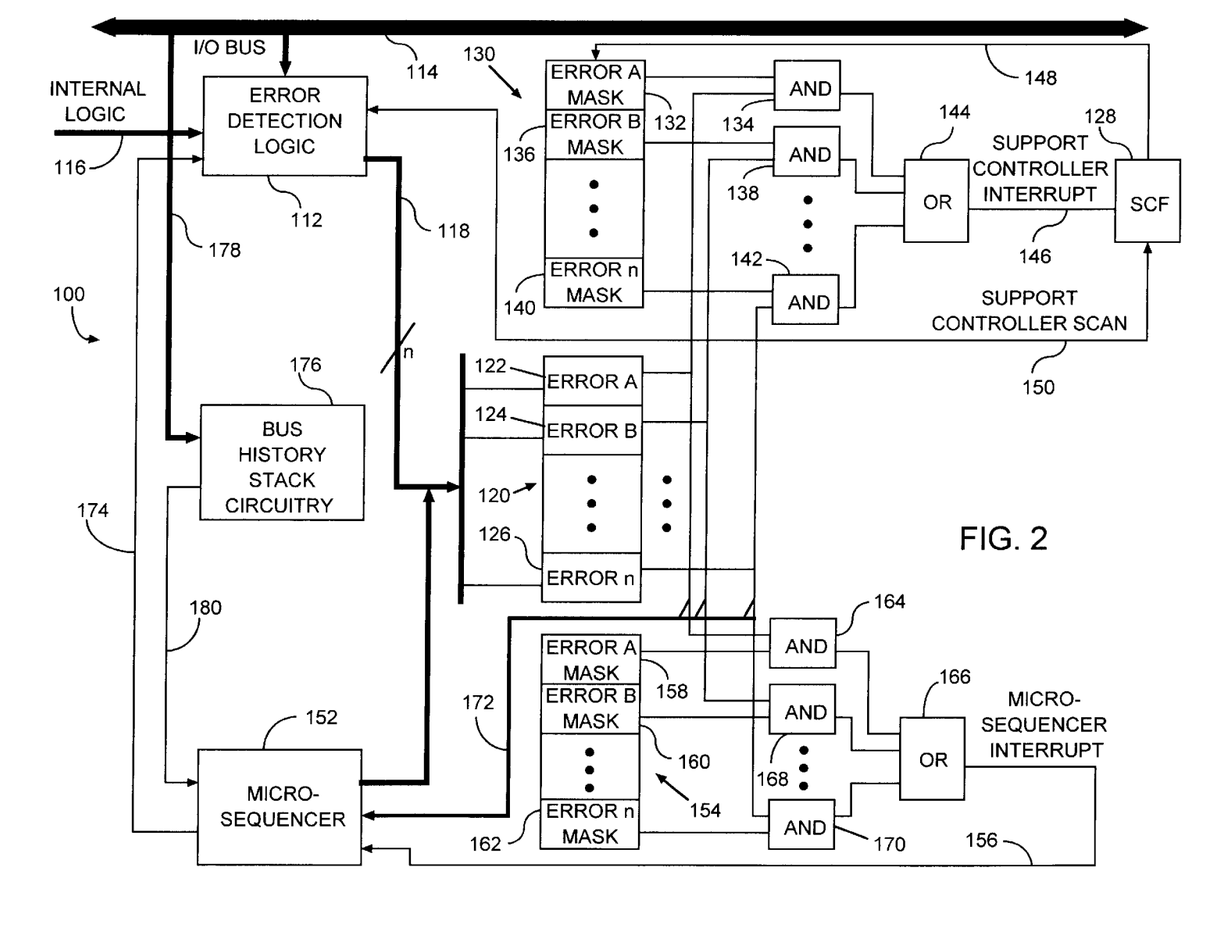
FIG. 2 illustrates a more detailed diagram of an error detection system in accordance with one embodiment of the present invention.

FIG. 2 illustrates an error detection system 100 in accordance with the present invention. The error detection system 100 includes error detection logic 112 which is shown coupled to the input/output (I/O) bus 114 to detect errors from various I/O devices. Other errors, such as internal logic errors (e.g., hardware errors within the printed circuit board or integrated circuit housing the error detection logic 112) are also received at the error detection logic 112, as represented by line 116.

When the error detection logic 112 has detected the presence of one or more errors, an errors signal is sent via bus 118 to error register 120. Error register 120 is an n-bit register used to latch particular errors that were detected by the error detection logic 112. Each of the n signals in bus 118 are provided to a different bit location in the error register 120. Error register 120 includes n error latches, labeled error A 122, error B 124, through error n 126.

Errors which have been logged in the error register 120 can notify a support controller of the presence of the error. The support controller, labeled the system control facility (SCF) 128, represents a device for monitoring, reporting, and recovering from various error conditions. Such a support controller 22 was described in connection with FIG. 1. The SCF 128 can set the error mask register 130 so that the SCF 128 will no longer sense the presence of an error. This may be beneficial in situations where a particular error continually interrupts the SCF 128, and the SCF 128 merely wants to ignore the error. However, in other cases, the occurrence of a particular error may not be suitable for masking, as the nature of the error is such that the system or data can be corrupted due to the error. In such cases, masking the error to the SCF 128 is not beneficial, because a recovery action is actually needed rather than a masking function.

The error mask register 130 works in conjunction with the error register 120 by providing a bit-to-bit mask bit field for each of the error bit fields 122, 124 through 126. For example, the error A mask 132 in the error mask register 130 is used to mask an error A in the error A bit field 122. This is accomplished by providing an AND function, represented by the AND gate 134, of the error A mask bit field 132 and the error A bit field 122. Similarly, the error B mask bit field 136 and the error B bit field 124 are provided to AND gate 138. Each of the error bit fields corresponds to a particular error mask bit field in the error mask register 130, through the error n mask bit field 140 and the error n bit field 126, which is transmitted to the AND gate 142. Where the particular mask bit field is asserted in the error mask 130, the AND gates 134, 138 through 142 will enable the error signal in the error bit fields 122, 124 through 126 of register 120 to be passed to the OR-gate 144. Therefore, the occurrence of any errors in the error register 120 which are enabled by corresponding error mask bit in the error mask register 130 will cause the OR-gate 144 to generate a support controller interrupt on line 146 to the SCF 128. The SCF 128 can attempt to recover from the error, or can mask out subsequent occurrences of the error by changing the error mask bits in the error register 130 via line 148. In order to attempt to recover from the error, the SCF 128 can perform a static scan function via line 150 to the error detection logic 112 in order to determine what the particular error is.

An attempted recovery by the SCF 128 is a very slow process using a static scan operation. The SCF may cause a unit's normal operation to be interrupted by stopping the unit's clock to perform the scan operation in order to clear the error condition. The present invention provides additional circuitry to more quickly recover from error conditions which are not capable of being adequately handled by the SCF 128. For example, where the SCF 128 performs a static scan operation via line 150 to clear a particular error at the error detection logic 112, the time delay may be such that another system fault occurs due to a system time out, or that the system is stopped due to the unit's system clock being terminated. The present invention provides a processing device, labeled the microsequencer 152 and associated circuitry to allow speedy recovery for various errors.

The microsequencer 152 can be resident on any one or more units, such as printed circuit boards (PCB). The microsequencer 152 and its associated circuitry can be configured to bypass support controller interrupts to the SCF 128, and replace them with interrupts to the microsequencer 152 which then can recover from the error rather than the SCF 128.

In order for the microsequencer 152 to handle particular errors rather than the SCF 128, the error must be masked in the error mask register 130 so that a support controller interrupt on line 146 will no longer occur for that particular error. Similarly, a microsequencer error mask bit must be set in the microsequencer error mask register 154, in order to enable a microsequencer interrupt on line 156.

The microsequencer error mask register 154 includes an error A mask field 158, and error B mask field 160 through an error n mask field 162. The error A mask field 158 is compared with the error A bit field 122 of the error register 120 at AND gate 164. Where the error A mask field 158 is set such that it will not mask an error A signal from the error A field 122 (an active high logic level in the example of FIG. 2), the presence of an error A signal in the error A field 122 will be passed through AND gate 164 to the OR-gate 166 where a microsequencer interrupt is generated. In a similar manner, any error sent via bus 118 to the error register 120 can be allowed to generate a support controller interrupt on line 146, or a microsequencer interrupt on line 156. Therefore,where an error mask field is cleared at the error mask register 130 to allow the support controller interrupt to occur, the corresponding error mask field at the microsequencer error mask register 154 will be set to mask that particular error. Analogously, any errors masked at the error mask register 130 will be set in the microsequencer error mask register 154 such that a microsequencer interrupt on line 156 will occur for that particular fault.

AND gates 164, 168 through 170 provide the logic required to assert the microsequencer interrupt on line 156 when its associated error bit is set and that error has not been masked at the microsequencer error mask register 154. The occurrence of any unmasked error will cause the corresponding AND gate 164, 168 through 170 to be recognized at the OR-gate 166, which in turn generates the microsequencer interrupt on line 156.

When the microsequencer 152 has been interrupted by the microsequencer interrupt on line 156, the microsequencer 152 can recover from that error. The microsequencer 152 receives the particular error signal via bus 172, which provides the error A, error B through error n signals from the error A field 122, error 13 field 124 through error n field 126 respectively. The ability for the microsequencer 152 to read the error register 120 allows the microsequencer 152 to perform error analysis, as it therefore knows the particular error that occurred. The microsequencer 152 includes recovery routines which can be stored at the microsequencer 152 itself, or alternatively in a separate memory device (not shown). These microcode recovery routines are prepared in advance and written to properly recover from an error presented to the microsequencer 152 via bus 172. For example, a microcode recovery routine can be executed at the microsequencer 152 when an error has been registered in the error A bit field 122, which caused the microsequencer interrupt on line 156 to interrupt the microsequencer 152. The microsequencer 152 determines via bus 172 that the error was from the error A bit field 122. A microcode recovery routine can be triggered in response to this particular error. For example, this error could be one where a particular block address is incorrect after being passed through a particular region of the hardware. In such a case, the microcode recovery routine executed by the microsequencer 152 can be programmed to terminate that particular block address transfer, and restart the transfer using the appropriate block address. Using this recovery code allows a test to continue to run despite the fact that known hardware problem exists. Furthermore, this also allows known hardware problems to be corrected without having to correct defective hardware in a custom chip, which can be prohibitively expensive and time consuming.

The microsequencer 152 is also coupled to the error detection logic 112 via line 174. The signal on line 174 is a "clear error" signal which causes the error detection logic 112 to clear the particular fault that the microsequencer 152 recognized from the error register 120. Errors have to be cleared from the error detection logic 112 after the microsequencer 152 has recovered from the error by way of the microcode recovery routine in order to rearm the error detection logic 112. Receipt of the signal on line 174 by the error detection logic 112 allows the error that occurred to be cleared, and allows that error to again be recognized by the error detection logic 112 if it again arises. Therefore, a repeating hardware error can be detected by the error detection logic 112 each time the error occurs, and a microsequencer interrupt will occur on line 156 to notify the microsequencer 152 to recover from the fault using the error recovery routines. The microsequencer 152 can provide information to the SCF 128 for error logging and reporting, even though the SCF 128 did not participate in the error recovery.

The microsequencer 152 reads the error register 120 by way of bus 172 to determine which error occurred. The microsequencer can further analyze particular errors by analyzing information transmitted across a bus. The present invention includes the bus history stack circuitry 176 to allow the microsequencer 152 to analyze bus data. The bus history stack circuitry 176 of FIG. 2 is coupled to the I/O bus 114 by way of bus 178, and is also coupled to the microsequencer 152 via a connection represented by bus 180. The bus history stack circuitry 176 allows certain signals from the I/O bus 114 to be captured for further analyzation by the microsequencer 152. This provides the microsequencer 152 with information that can be used to recover from particular errors. The information captured by the bus history stack circuitry 176 therefore assists the microsequencer 152 in performing error recovery.

Figure 3:
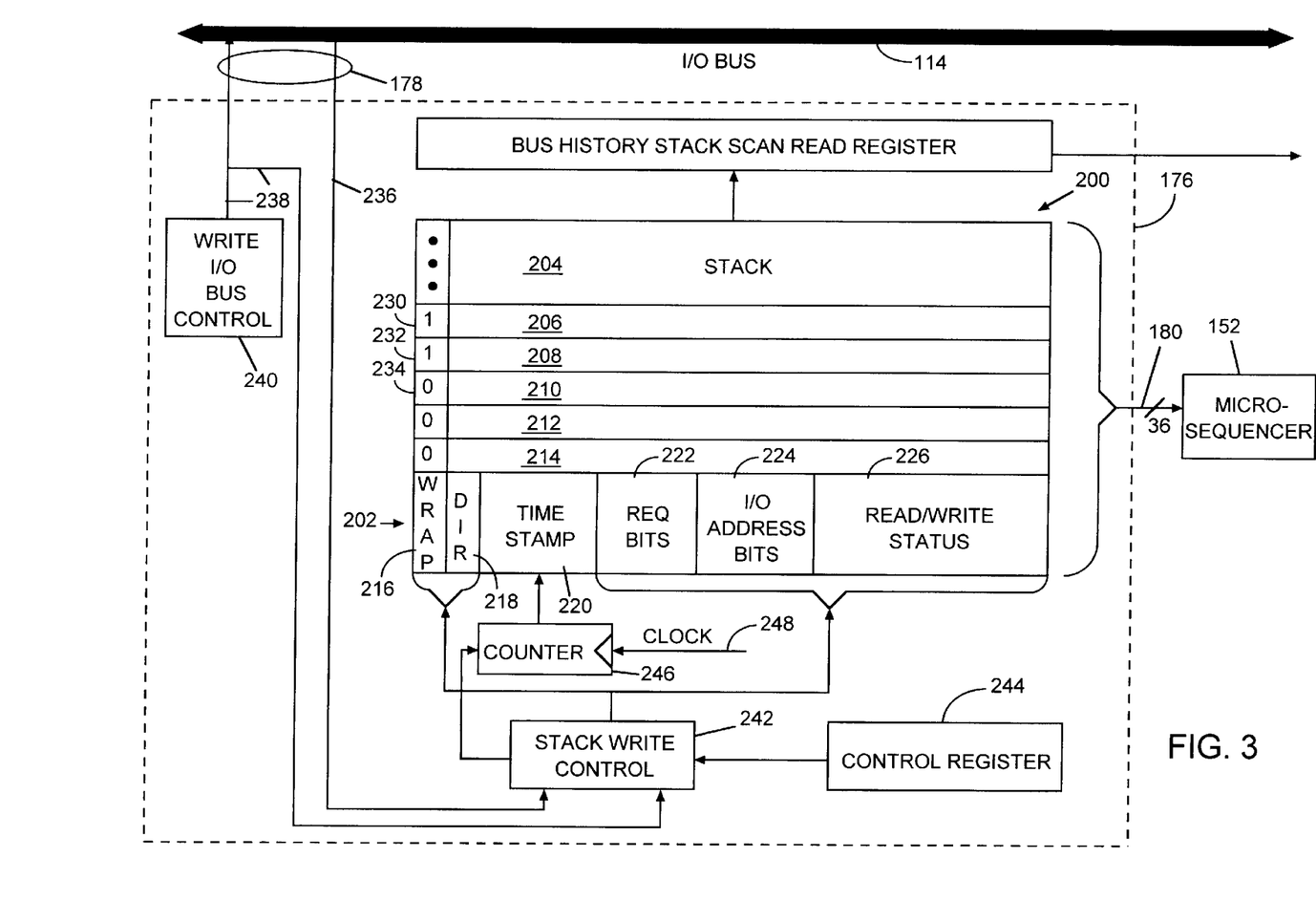
FIG. 3 is a block diagram of the bus history stack circuitry in accordance with one embodiment of the present invention.

FIG. 3 is a block diagram of the bus history stack circuitry 176 in accordance with one embodiment of the present invention. As will be appreciated in the following description, the bus history stack circuitry 176 is programmable to capture data based on predefined criteria. Time stamps are also stored with all of the information, to assist with the bus performance analyzation. Various parameters can be set to detect certain types of data in a manner most desirable by the user. This flexibility is a powerful factor in the error recovery system 100 of FIG. 2.

Referring to FIG. 3, the bus history stack circuitry 176 is shown coupled to the I/O bus 114 via bus 178. A bus history stack 200 represents a portion of the bus history stack circuitry 176 which stores the information obtained from, or directed to, the I/O bus 114. In one embodiment of the invention, the bus history stack 200 is a 1K×40 bit static random access memory (SRAM).

The bus history stack 200 stores the desired information in a predetermined format. The bus history stack 200 format in accordance with one embodiment of the invention is illustrated as bus history value segment 202, which represents any of the bus history value segments 204 and individually illustrated bus history value segments 206, 208, 210, 212 and 214 in bus history stack 200. Bus history values are stored in the bus history value segments in one or more memory locations of the particular memory device. It should be recognized that the bus history stack 200 can be any desired width (i.e., number of bits wide) or depth (i.e., number of bytes/words deep) without departing from the scope and spirit of the invention.

The particular bus history stack 200 bit definitions for the example of FIG. 3 are illustrated in connection with bus history value segment 202. Included is the wrap field 216, the direction field 218, the time stamp field 220, the request type field 222, the I/O address field 224, and the read/write status field 226. The bus history stack 200 bit definitions are shown in more detail in FIGS. 4, 5 and 6.

In the example of FIG. 3, the bus history stack 200 is forty bits wide, but the microsequencer 152 operates on a 36-bit bus. For any bus of lesser width than the bus history stack 200, the bus history stack is separated into an upper and lower word (i.e., two "stack locations") which together comprise one bus history value. For example, the bus history value segment 206 may be "divided" into contiguous upper and lower memory locations, so that the bus history value corresponding to bus history value segment 206 actually utilizes twD of the forty-bit wide memory locations of the memory device providing the bus history stack 200. The fields 216, 218, 220, 222, 224 and 226 of a "divided" bus history value are described in FIGS. 4, 5 and 6 below.

Figure 4:
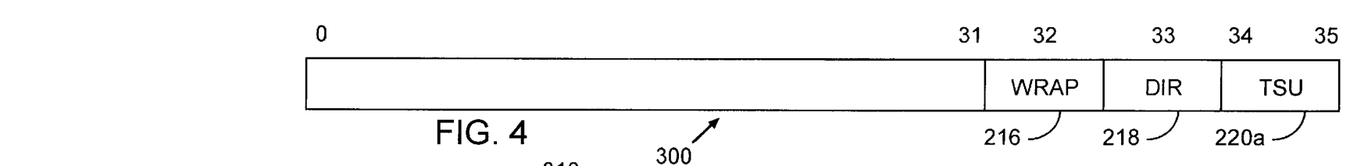
FIG. 4 illustrates the upper portion of the bus history value segment which, in one embodiment of the invention, is used to store a first number of bus history value bits of the bus history value.

Referring now to FIGS. 3 and 4, the upper portion of the bus history value segment 202, labeled the upper stack location 300, is illustrated. In order to provide forty bits across the 36-bit bus 180, thirty-six bits can be provided in one portion of the bus history value segment 202, and the remaining four bits can be provided in the other portion of the bus history value segment 202. FIG. 4 illustrates the use of one stack location 300 to store the first four bus history value bits of the bus history value. The remaining thirty-six bits of the bus history value will be described in FIGS. 5 and 6.

Figure 5:
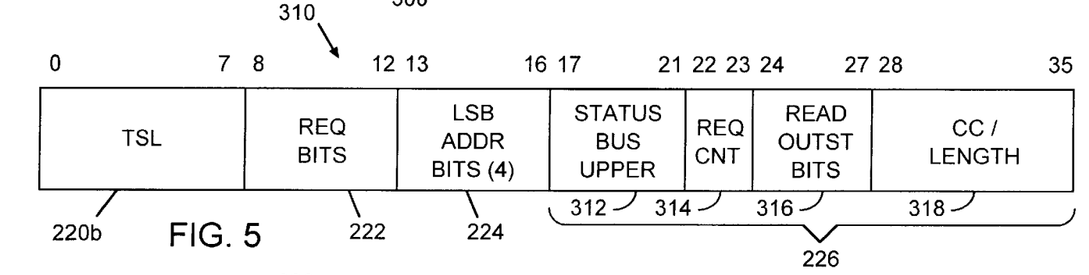
FIGS. 5 and 6 illustrate two embodiments of the lower portion of the bus history value segment which are used to store a second number of bus history value bits of the bus history value.
Figure 6:
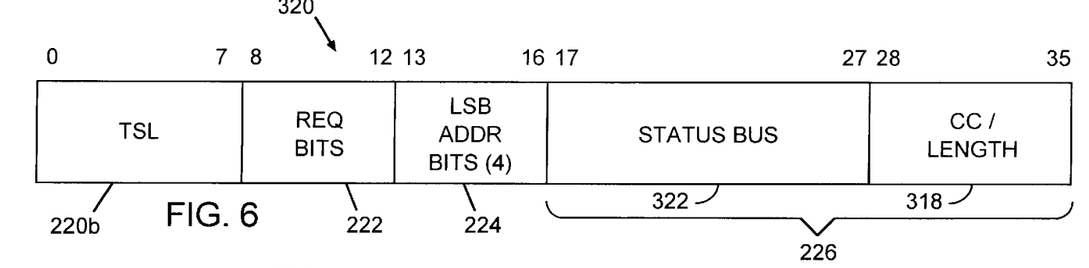

The first thirty-two of thirty-six bits (bits 0–31) of the upper stack location 300 are unused, and are preferably zero-filled. However, four of the upper stack location 300 bits are used, namely bits 32–35. Bit 32 represents the wrap field 216, bit 33 represents the direction field 218, and bits 34–35 represent the upper two bits (TSU 220a) of the time stamp field 220.

Bit 32, representing the wrap field 216, marks the last word of data recorded in the bus history attack 200. The bus history stack 200 is written in a circular-queue fashion, with data being entered into sequentially ascending memory locations. When the end of memory is reached, the next data write continues at the first memory location of the bus history stack 200. The bit value in the wrap field 216 currently being written is toggled upon a write to that stack location, in order to designate that stack location as the last memory location written. Therefore, a "wrap bit" in each stack location is toggled to designate it as the last of the circularly-queued data. The logic state of the wrap bit can be seen in FIG. 3, where bus history value segments 206 and 208 indicate in their respective wrap fields 230 and 232 that they have been written to (represented by binary "1"), and that the next available bus history value segment is bus history value segment 210 having a binary "0" in its wrap field 234. Because the wrap fields are "toggled" in the described example, a binary "1" to binary "0" transition would indicate the next available bus history value segment the next time through the circular queue.

Bit 33 of the upper stack location 300 of FIG. 4 represents the direction field 218. When set, this bit indicates that the stack location contains read response data from the I/O bus 114, as represented by connection 236 of bus 178 shown in FIG. 3. Conversely, when clear, the bit indicates that the data is write, read request, or message write data that was written to the I/O bus 114, as represented by connection 238 of bus 178. Data written to the I/O bus 114 is controlled by the write I/O bus control 240. The write I/O bus control 240 is used when the bus history stack circuitry 176 requests control of the I/O bus 114. Where the bus history stack circuit 176 wants to access the I/O bus 114, it issues a bus request. In requesting control of the bus, either write data, read requests, or message data is outputted by way of connection 238, depending on the operation to be performed. "Write data" is the information that is transmitted to be written to a memory, where "message write data" refers to the messages that are sent between the multiple processors of a computing system to properly coordinate activities. A "read request" is a request for data, where an address is included for the memory location where data is requested, and the number of bytes/words of information is also indicated in the read request. A "read response" refers to the acknowledgment sent by a device being read that it received the read request.

Data read from, or written to, the I/O bus is provided to the stack write control circuitry 242 via connections 236 and 238 respectively. The stack write control 242 works cooperatively with the control register 244. The stack write control circuit 242 receives the write data, read requests, or message data, and read response data depending on the contents of the control register 244. The control register 244 will be described in further detail in connection with FIG. 7.

Bits 34–35 of the upper stack location 300 represent the upper portion of the time stamp field 220, referred to as the time stamp upper (TSU) portion 220a. Bits 34–35 represent the two most significant bits of a ten-bit time stamp. The entire time stamp field 220 (see FIG. 3) receives information from the counter 246, which is a ten-bit counter in the example of FIG. 3. The counter is activated by the clock signal on line 248, and the time stamp field 220 records the number of clock pulses occurring between the current stack write and the last stack write. Each count in the time stamp field 220 represents a time corresponding to the period of the clock signal on line 248. The counter 246 is reset after every write to the bus history stack 200, so that the time stamp corresponding to each bus history value represents a time from the last write function to the bus history stack 200.

In one embodiment of the invention, the counter 246 may increment to its initial reset state (binary "0") prior to the occurrence of the next stack access. In other words, the delay between bus history stack writes is longer than the time reflected by the maximum value of the counter 246. In this case, a "null" value (binary "0" in a preferred embodiment) is recorded in the time stamp field 220 to indicate that a "long" delay of indeterminable length occurred between subsequent bus history stack accesses.

Referring now to FIGS. 5 and 6, the lower portion of the bus history value segment 202 is illustrated, labeled the lower stack location 310 and 320 respectively. FIG. 5 illustrates the use of a second stack location 310 to store the remaining thirty-six bus history value bits of the bus history value where the information stored in the bus history stack 200 is read response data received from the I/O bus 114 via line 236. Similarly, FIG. 6 illustrates a second stack location 320 to store the remaining thirty-six bus history value bits of the bus history value where the information stored in the bus history stack 200 is write data, read requests, or message data received from the write I/O bus control 240 via line 238.

FIGS. 5 and 6 each include the time stamp lower (TSL) fields 220b, the request type field 222, the I/O address field 224, and the read/write status field 226. The TSL field 220b includes the eight least significant bits of the ten-bit time stamp from the counter 245. The request type field 222 in stack locations 310 and 320 record the type of request corresponding to the bus access. In one embodiment, bit 8 of the request type field 222 represents a message write request, bit 9 represents a program packet read request, bit 10 represents a data read request, bit 11 represents a data buffer 0 write request, and bit 12 represents a data buffer 1 write request. The request type information in the request type field 222 is extracted from the information on lines 236 and 238 by the stack write control 242.

The four least significant bits of the address associated with the bus history stack 200 access are stored in the I/O address field 224, which includes bits 13–16 of the stack locations 310 and 320 in the illustrated embodiment of FIGS. 5 and 6. For write data, these bits will record the four least significant address bits of the writing unit's address, where the writing unit in this case is a printed circuit board (PCB) that includes the bus history stack circuitry 176 and other logic circuitry. Therefore, one embodiment of the invention includes a portion of the logic circuitry in an address area common to the bus history stack circuitry 176. For read-response data, I/O address field 224 reflects the four least significant address bits of the target unit's address, where the target unit could be any device which communicates via the I/O bus 114. The address bits in the I/O address field 224 is extracted from the information on lines 236 and 238 by the stack write control 242.

The read/write status field 226 of FIGS. 5 and 6 includes bits 17–35 in the illustrated embodiment. The field definition for the read/write status field 226 depends on whether the data recorded is read-response data, or whether the data recorded is write data, as indicated in the direction field 218.

Referring now to FIG. 5, the read/write status field 226 includes the status bus upper field 312, the request count field 314, the read outstanding bits field 316, and the command code and transaction length field 318. The status bus upper field 312 holds the bits 1–4 of a status bus which records status information. The request count field 314 indicates the length of the bus request information, and the read outstanding bits field 316 records the which read requests are outstanding (i.e., not yet completed). The command code and transaction length field 318 stores the command code and transaction length. The command code refers to the type of transaction occurring on the bus (e.g., read, write, message write, etc.), and the transaction length is the number of bytes/words being sent.

Referring now to FIG. 6, the read/write status field 226 includes the status field 322, and the command code and transaction length field 318. The command code and transaction length field 318 stores the command code and transaction length. The status field 322 records bus status information, and includes 11 bits in a preferred embodiment of the invention.

The information from fields 216, 218, 222, 224 and 226 which are stored in the bus history value 202 of the bus history stack 200 is extracted from the information on lines 236 and 238 by the stack write control 242. The time stamp of the time stamp field 220 is provided by the counter 246. Fields different from those described in the embodiment illustrated in FEGS. 3, 4, 5 and 6 may be used where other information is desired.

Figure 7:
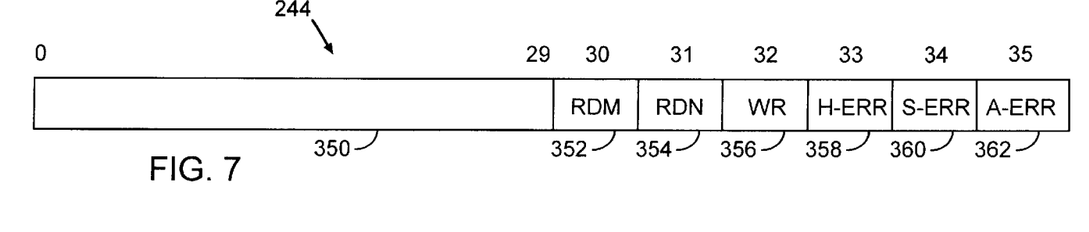
FIG. 7 is a diagram illustrating one embodiment of the contents of the programmable control register that allows a user to define the type of information that will be stored on the bus history stack.

FIG. 7 is a diagram illustrating the contents of the control register 244 in one embodiment of the invention. The control register 244 of FIG. 3 is a programmable register that allows a user to define the type of information that will be put on the bus history stack 200. The control register 244 is coupled to the stack write control 242 to control the actions of the stack write control 242. The stack write control 242 receives the information from lines 236 and 238, and extracts particular information to generate the bus history stack values onto the bus history stack 200. What information is extracted to generate the bus history stack values depends on the state of the control bits in the control register 244.

Referring to FIG. 7, a plurality of bit locations in the control register 244 are shown. In one embodiment of the invention, the unused field 350 includes thirty unused bits (bits 0–29 of the 36-bit control register 244). Where the response data match (RDM) field 352 is set, the stack write control 242 will put read response data onto the bus history stack 200, for only the read response data originating at circuitry associated with the module address of the bus history stack circuitry 176. Where the response data no-match (RDN) field 354 is set, the stack write control 242 puts read response data originating at other modules onto the bus history stack 200. Where the RDM 352 or RDN 354 fields are set, the direction bit in the direction field 218 will set to indicate that the information is associated with read data. Where the write data (WD) field 356 is set, the stack write control 242 puts write data, read request, and message write data onto the stack, and the direction bit in the direction field 218 will clear to indicate that the data is write, read request, or message write data that was written to the I/O bus 114.

The H-ERR field 358, S-ERR field 360 and the A-ERR field 362 are each fields used to clear the RDM, RDN and WR bits under certain circumstances. The H-ERR field 358, is set when a hardware error occurs, which causes bits 30–32 to be cleared. The S-ERR field 360, is set when a software error occurs, which causes bits 30–32 to be cleared. The A-ERR field 362, is set when any unmasked error occurs, which causes bits 30–32 to be cleared. As will be appreciated by those skilled in the art, other conditional bit manipulations may be used without departing from the scope and spirit of the invention.

Figure 8:
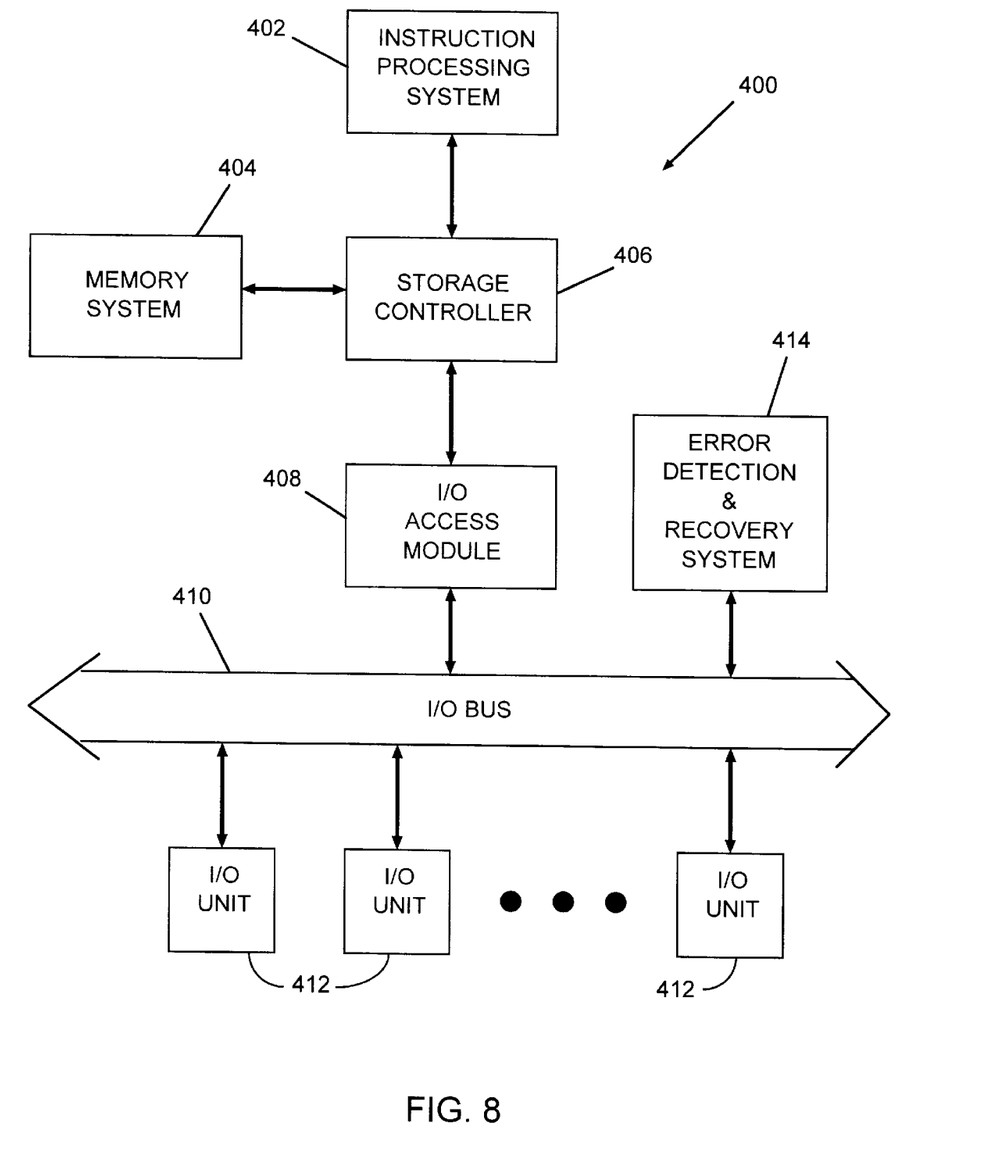
FIG. 8 is a block diagram of one system in which the present invention is utilized.

FIG. 8 is a block diagram of one system in which the present invention is utilized. The computer system 400 includes an instruction processing system 402, which may include one or more instruction processors. System storage is accomplished by the memory system 404, which may include one or more storage units. A storage controller 406 controls data movement between the instruction processing system 402 and the memory system 404. The storage controller 406 also provides expansion capabilities to allow additional instruction processors and memory systems to be added to the computer system 400.

The I/O access module 408 provides an interface between the storage controller 406 and the input/output (I/O) bus 410. The I/O bus 410 is in turn coupled to a plurality of I/O units 412. The present invention provides the error detection and recovery system 414. The error detection and recovery system 414 is coupled to the I/O bus 410 in order to be able to allow the error detection logic 112 (see FIG. 2) to receive error information from any of the I/O units 412 in the computer system 400, and further to allow the bus history stack circuitry 176 (see FIGS. 2 and 3) to monitor information being written to, and read from, the I/O bus 410.

In a preferred embodiment of the invention, the error detection and recovery system 414 is included within one of the circuits, such as the I/O units 412. Any of the I/O units 412 can include an error detection and recovery system 414 such that its respective I/O unit can recover independently without requiring system recovery. In such an embodiment, only one SCF 128 is provided for the computer system 400, and unit-level recovery is performed at each I/O unit 412, or other logic subdivision, that includes error detection and unit-level recovery (i.e., a microsequencer 152 and related circuitry).

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. An error detection and recovery circuit to monitor for hardware errors in a system having one or more logic units, the error detection and recovery circuit comprising:

error detection means coupled to the one or more logic units for detecting errors in the one or more logic units, and for providing a plurality of error signals corresponding to different ones of the errors detected;

first error recovery means for receiving the plurality of error signals, and for performing system-level recovery in response to each of the plurality of error signals;

second error recovery means for receiving the plurality of error signals, and for performing unit-level recovery through real-time execution of error recovery routines at the logic unit generating the error; and error recovery selection means, coupled to receive the plurality of error signals, for selectively enabling the first error recovery means to identify any of a first group of the plurality of error signals, and for selectively enabling the second error recovery means to identify any of a second group of the plurality of error signals.

2. The error detection and recovery circuit as in claim 1, wherein the error recovery selection means comprises:

a first mask register having first mask bit locations corresponding to each of the plurality of error signals to enable the first group of error signals to be recognized by the first error recovery means when the corresponding first mask bit locations are set to an enabling logic state; and a second mask register having second mask bit locations corresponding to each of the plurality of error signals to enable the second group of error signals to be recognized by the second error recovery means when the corresponding second mask bit locations are set to the enabling logic state.

3. The error detection and recovery circuit as in claim 1, wherein the error recovery selection means comprises:

a first mask register having first mask bit locations corresponding to each of the plurality of error signals to prevent the first group of error signals from being recognized by the first error recovery means when the corresponding first mask bit locations are set to a masked logic state; and a second mask register having second mask bit locations corresponding to each of the plurality of error signals to prevent the second group of error signals from being recognized by the second error recovery means when the corresponding second mask bit locations are set to the masked logic state.

4. The error detection and recovery circuit as in claim 1, wherein the error recovery selection means comprises:

error register means, coupled to receive the plurality of error signals from the error detection means, for latching the plurality of error signals, first masking means, coupled to the error register means, for selecting which of the plurality of error signals latched by the error register means is to be identified at the first error recovery means; and second masking means, coupled to the error register means, for selecting which of the plurality of error signals latched by the error register means is to be identified at the second error recovery means.

5. The error detection and recovery circuit as in claim 4, further comprising:

first interrupt generation means, coupled to the first masking means and the error register means, for generating a first interrupt signal to the first error recovery means when any one of the plurality of error signals latched by the error register means is enabled by the first masking means, wherein the first interrupt signal initiates performing the system-level recovery; and second interrupt generation means, coupled to the second masking means and the error register means, for generating a second interrupt signal to the second error recovery means when any one of the plurality of error signals latched by the error register means is enabled by the second masking means, wherein the second interrupt signal initiates performing the unit-level recovery at the logic unit generating the error.

6. The error detection and recovery circuit as in claim 1, wherein the first error recovery means comprises means for logically removing the logic units generating the error from a total of the one or more logic units in the system.

7. The error detection and recovery circuit as in claim 1, wherein the first error recovery means comprises means for receiving all of the errors signals generated in the system.

8. The error detection and recovery circuit as in claim 7, wherein the second error recovery means comprises means for receiving only those of the error signals generated at the logic unit of the second error recovery means.

9. The error detection and recovery circuit as in claim 1, wherein the second error recovery means comprises a processing device having a memory to store the error recovery routines.

10. The error detection and recovery circuit as in claim 1, wherein the second error recovery means comprises routine selection means for executing a different one of the error recovery means for each of the plurality of error signals received.

11. The error detection and recovery circuit as in claim 1, further comprising bus history stack means, coupled to the second error recovery means, for collecting system information transmitted via a bus, and for providing the system information to the second error recovery means to assist in performing the unit-level recovery.

12. The error detection and recovery circuit as in claim 11, wherein the bus history stack means comprises a memory stack having a plurality of memory locations to store a corresponding plurality of bus history values.

13. The error detection and recovery circuit as in claim 12, further comprising a programmable control means for allowing a plurality of different types of the system information to be collected in the memory stack.

14. The error detection and recovery circuit as in claim 13, further comprising stack write control means, coupled to the programmable control means and coupled to the memory stack, for extracting particular system information to generate the bus history stack values in response to control information entered at the programmable control means.

15. An error detection and recovery circuit for recovering from hardware errors in a target circuit, the error detection and recovery circuit comprising:

error detection means coupled to the target circuit for detecting errors in the target circuit, and for providing a plurality of error signals corresponding to different ones of the errors detected;

a plurality of error recovery means, each coupled to the error detection means for receiving predetermined ones of the error signals, and each for performing error recovery through real-time execution of one of a plurality of error recovery routines corresponding to a particular one of the predetermined error signals;

error masking means for selectively masking out the error signals associated with at least one of the plurality of error recovery means to allow a remaining one or more of the error recovery means to perform error recovery independent from the error recovery means that has been masked out; and bus history analyzing means, coupled to the error recovery means, for collecting system information transmitted via a bus, and for providing the system information to the error recovery means to assist in the error recovery.

16. The error detection and recovery circuit as in claim 15, wherein the bus history analyzing means comprises a memory stack having a plurality of memory locations, and wherein each of the memory locations stores a bus history value.

17. The error detection and recovery circuit as in claim 16, wherein each of the memory locations comprises a plurality of information fields to store a plurality of information segments which aggregately comprise the system information.

18. The error detection and recovery circuit as in claim 17, wherein a first field of the plurality of information fields is a time stamp field to store a time value corresponding to a time period from a current bus history value entry to a previous bus history value entry.

19. The error detection and recovery circuit as in claim 18, further comprising a counter coupled to the bus history analyzing means to provide a count value to the time stamp field.

20. The error detection and recovery circuit as in claim 19, wherein the counter comprises a reset input to allow the counter to be reset each time a new bus history value is entered into one of the memory locations.

21. The error detection and recovery circuit as in claim 17, wherein the memory stack comprises a circular-queue memory, and wherein a second field of the plurality of information fields is a wrap field to identify the bus history value most recently entered.

22. The error detection and recovery circuit as in claim 17, wherein the memory stack comprises a request type field to store a bus access type for each of the bus history values.

23. The error detection and recovery circuit as in claim 17, wherein the memory stack comprises a direction field to indicate whether each of the bus history values corresponds to system information written to the bus, or read from the bus.

24. The error detection and recovery circuit as in claim 17, wherein the memory stack comprises an address field to store an address of data read and data write commands transmitted across the bus.

25. The error detection and recovery circuit as in claim 16, further comprising a programmable control means for allowing a plurality of different types of the system information to be collected into the memory stack.

26. The error detection and recovery circuit as in claim 25, wherein the programmable control means comprises a dynamically modifiable register having a plurality of bit locations, wherein a bit state associated with each of the bit locations defines the type of system information to be collected.

27. The error detection and recovery circuit as in claim 26, further comprising stack write control means, coupled to the programmable control means and coupled to the memory stack, for extracting particular system information to generate the bus history stack values in response to the bit states.

28. An error detection and recovery circuit for recovering from hardware errors in a target circuit, the error detection and recovery circuit comprising:

error detection means coupled to the target circuit for detecting errors in the target circuit, and for providing a plurality of error signals corresponding to different ones of the errors detected;

error recovery means, coupled to the error detection means, for receiving the plurality of error signals, and for performing error recovery through real-time execution of one of a plurality of error recovery routines corresponding to a particular one of the error signals;

bus history analyzing means, coupled to the error recovery means, for collecting system information transmitted via a bus, and for providing the system information to the error recovery means to assist in the error recovery, wherein the bus history analyzing means comprises a memory stack having a plurality of memory locations, and wherein each of the memory locations stores a bus history value; and further comprising a programmable control means for allowing a plurality of different types of the system information to be collected into the memory stack, wherein the plurality of different types of system information is selected from the group comprising local read response data, remote read response data, write data, read request data, and message write data.

29. The error detection and recovery circuit as in claim 15, wherein the bus history analyzing means comprises means for providing a predetermined sequence of events previously transmitted via the bus.

30. An error detection and recovery circuit to monitor for errors in a system having one or more logic units, the error detection and recovery circuit comprising:

an error detector coupled to the one or more logic units, having an error output terminal to provide a plurality of error signals corresponding to different ones of the errors detected;

a first error processor to receive the plurality of error signals and to perform recovery of the system in accordance with the plurality of error signals;

a second error processor to receive the plurality of error signals and to perform recovery of the logic unit generating the error through real-time execution of error recovery routines at the logic unit; and a selector, coupled to the first error processor, the second error processor, and the error detector, having inputs to receive the plurality of error signals, and having first selector outputs to provide first selection signals to allow the first error processor to recover from any of a first group of the plurality of error signals, and having second selector outputs to provide second selection signals to allow the second error processor to recover from any of a second group of the plurality of error signals.

31. The error detection and recovery circuit as in claim 30, further comprising a memory stack having a plurality of memory locations, wherein the memory stack stores bus information for use by the second error processor in performing recovery of the logic unit.

32. The error detection and recovery circuit as in claim 31, further comprising a programmable controller, coupled to the memory stack, to allow a plurality of different types of the bus information to be collected in the memory stack.

33. The error detection and recovery circuit as in claim 32, further comprising a comparator, coupled to the programmable controller and coupled to the memory stack, to extract a particular type of the bus information in response to control information entered at the programmable controller.

* * * * *